United States Patent [19]

Nothnagel

[11] 4,438,072
[45] Mar. 20, 1984

[54] CONTINUOUS STREAM MIXER HAVING VARIABLE DWELL TIME CHAMBER WITH AUGER

[75] Inventor: Joseph L. Nothnagel, Saukville, Wis.

[73] Assignee: Freeman Chemical Corporation, Port Washington, Wis.

[21] Appl. No.: 350,861

[22] Filed: Feb. 22, 1982

[51] Int. Cl.³ .................... C08J 9/00; B01F 13/10; B01F 15/04; B29D 27/02
[52] U.S. Cl. ............................ 422/133; 134/22.12; 134/22.18; 134/23; 422/134; 422/135; 422/137; 422/229
[58] Field of Search ............... 422/133, 134, 135, 137, 422/229; 134/22.12, 22.18, 23

[56] References Cited

U.S. PATENT DOCUMENTS

| | | | |
|---|---|---|---|
| 2,939,770 | 6/1960 | Schwartzkopff et al. | 422/229 |
| 3,167,531 | 1/1965 | Parker et al. | 422/135 X |
| 3,257,173 | 6/1966 | Parnell | 422/137 |
| 3,356,763 | 12/1967 | Bollinger et al. | 422/134 X |
| 3,424,439 | 1/1969 | Baker | 422/133 X |
| 3,454,545 | 7/1969 | Scoggin | 422/135 X |
| 3,607,719 | 12/1972 | Goffinet | 422/137 X |
| 3,627,275 | 12/1971 | Gusmer | 422/133 X |
| 4,316,875 | 2/1982 | Bar et al. | 422/133 |

Primary Examiner—Barry S. Richman

[57] ABSTRACT

A mixing apparatus includes a dwell chamber located between two mixing heads. An elongate, reverse-twist auger is provided within the dwell chamber. Valves are provided to permit washing the mixing apparatus and a dispensing valve includes the capability of directing product to a discard container.

8 Claims, 4 Drawing Figures

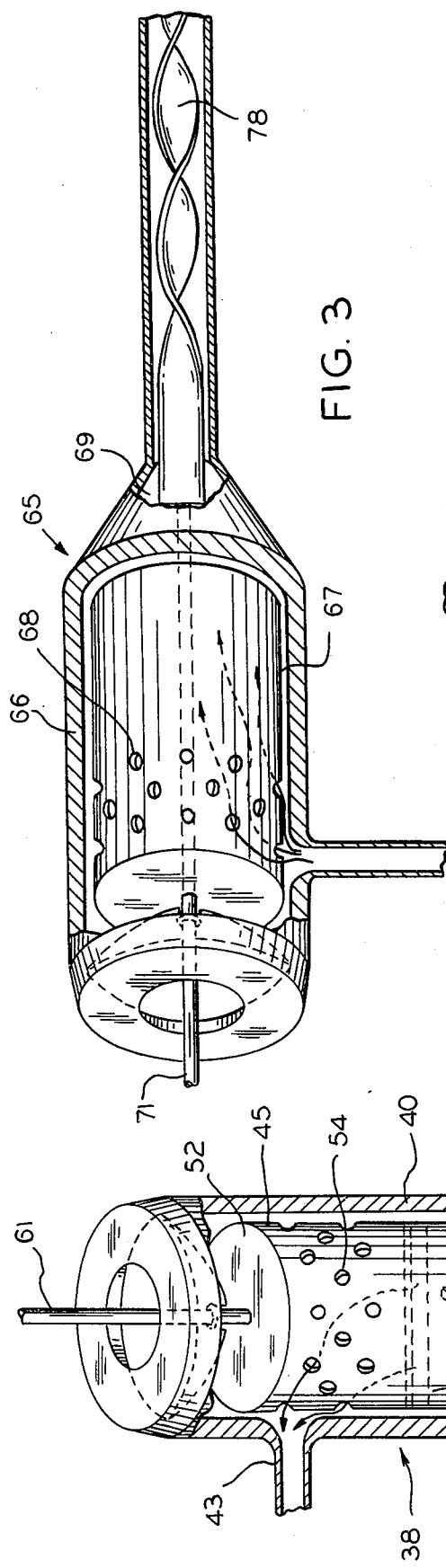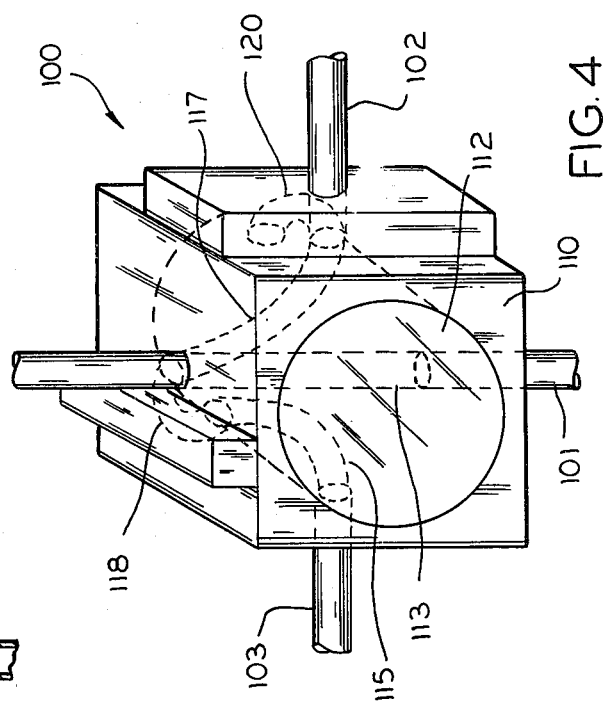

CONTINUOUS STREAM MIXER HAVING VARIABLE DWELL TIME CHAMBER WITH AUGER

BACKGROUND OF THE INVENTION

1. Field of the Invention

This invention relates to a tandem, two-component mixer having an elongate dwell chamber. A reverse twist auger is located in the dwell chamber to provide continuous scraping of the dwell chamber wall and prevent a buildup of material therein. While the mixer of the present invention has a variety of uses, it is particularly well suited for the preparation of polyurethane gels filled with dispersed, discrete particles of aqueous solutions.

2. Description of the Prior Art

Tandem, two-component mixers are known to the mixing art and some of such mixers include a dwell chamber between the two mixing heads. Such prior art machines do not, however, have the ability to deliver a continuous stream of product where the reactants mixed in the machine gel rapidly. Such prior art mixers also permit a buildup of reactive material on the walls of the dwell chamber.

There are many chemical systems where it is desirable to provide a continuous product stream and where mixing control is important due to the reactivity of the various chemical substances. Cleanup of such systems is frequently difficult where the reactants have accumulated on the walls of the system or where adequate washing of the mixer components is prevented by improper mixer design.

One such chemical system is polyurethane gels formed by mixing a polyisocyanate prepolymer with an aqueous liquid. The prepolymer may be a prepolymer of an organic di-isocyanate and a polyether diol or triol, and the aqueous liquid may be water. Rapid mixing of the two components causes a gel to form and the final product desirably contains a homogeneous dispersion of discrete droplets throughout the gel. The final properties of such gels can be varied by the choice of starting materials and by the mixing techniques employed. The gel can have open or closed cells depending on these various factors and the nature of the cells can be adjusted by varying the solute in the aqueous solution. For example, the aqueous solution may contain colors, perfumes, fire retardants, electrically conductive materials and the like.

Gels such as those just described can be cast to a specific shape or can be formed in a mass for selected uses. The gels may also be extruded. Typical uses of such gels are in building construction, marking devices, prosthetic devices, medical devices, etc.

While the preparation of such gels is known, equipment has not been available for production of the gel on a continuous and reliable basis. Equipment required for this system must have the capability of efficiently mixing the reactants over a wide range of mixing conditions and must prevent gelled product from building up within the apparatus. Finally, the equipment must also be capable of being thoroughly washed to prevent permanent accumulations of product which would destroy the equipment or reduce its efficiency.

STATEMENT OF THE INVENTION

It is a primary object of the present invention to provide a mixing apparatus which overcomes the aforementioned problems of the prior art devices.

Another object of the present invention is to provide a two component mixing apparatus which includes mixing and dwell capabilities.

Yet another object of the present invention is to provide a mixing apparatus for two materials which also includes a provision for addition of a third material as a reactant or as a washing material.

A still further object of the present invention is to provide a mixing apparatus having an efficient dwell chamber mixing system.

A further object of the present invention is to provide a mixing apparatus which includes a dispensing valve capable of dispensing mixed reactants into one of two paths and which also includes means for cleaning said valve to prevent buildup of reacted materials therein.

According to the present invention, a tandem, two-component mixer includes a dwell chamber located between two mixing heads. Pumps, valves and flow gauges are provided for the two components to insure that the correct amounts of materials are reacted. A reverse twist auger is located within the dwell chamber, the auger insuring further mixing of the components and preventing a buildup of material in the dwell chamber. After product leaves the dwell chamber, it travels to a second mixing head and then enters a final valve. The latter is designed to permit the product to be dispensed through two paths and thus permits the entire system to be operated continuously. Moreover, the apparatus is designed so that all sections which have been contacted by the mixed reactants may be thoroughly flushed with a cleaning liquid. The mixer of the present invention may be variously embodied and may be used with a variety of reactive systems, all of which will be more apparent upon reading the following detailed description of the preferred embodiment.

DESCRIPTION OF THE DRAWINGS

FIG. 2 is an enlarged view of the first mixing head used with the mixer of the preferred embodiment of the present invention, with parts broken away to show detail;

FIG. 3 is an enlarged view of a second mixing head used with the mixer of the preferred embodiment of the present invention, with parts broken away to show detail; and, FIG. 4 is an enlarged schematic of the dispensing valve used with the mixer of the preferred embodiment of the present invention.

DESCRIPTION OF THE PREFERRED EMBODIMENT

Figure 1:
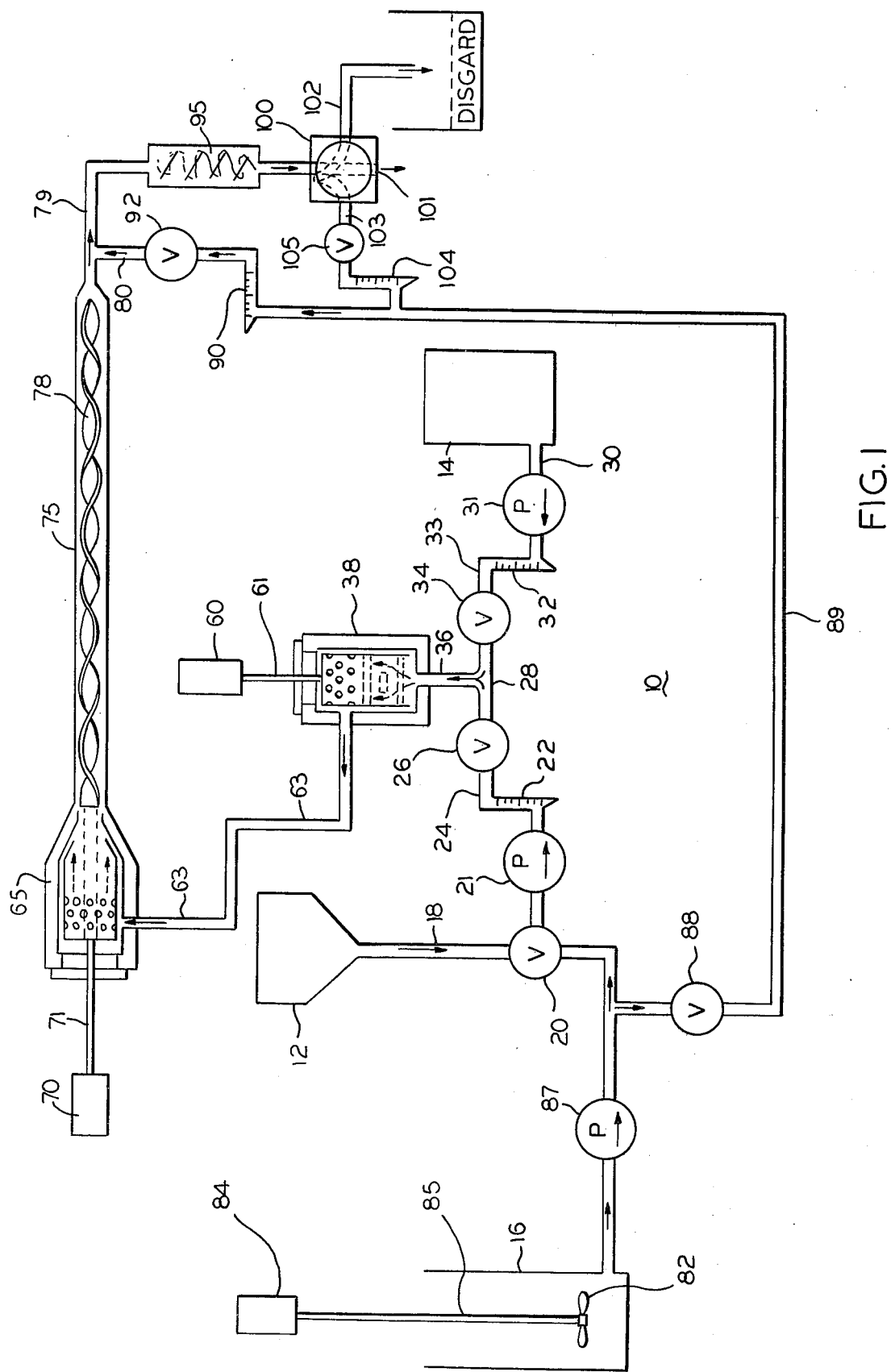
FIG. 1 is a schematic diagram of a mixer of the preferred embodiment of the present invention.

The preferred embodiment of the present invention will be described with reference to the aforementioned polyurethane gel system, but it should be understood at the outset that the use of that system in the description is for purposes of illustration rather than limitation. Many other chemical systems require intimate mixing of reactants and a dwell chamber. The present invention is also useful for such other systems.

Proceeding now to the description of the preferred embodiment of the present invention, a mixer 10 is shown in FIG. 1 in generally schematic form. Three reservoirs are provided for the reactants and for a cleaning liquid. A first reservoir 12 is provided for the polyisocyanate prepolymer. Reservoir 12 may be a tank or other suitable container and in the preferred embodiment includes a collapsing diaphragm cover (not shown) to prevent air from contacting the prepolymer. As previously mentioned, the prepolymer may be a prepolymer of an organic di-isocyanate and a polyether diol or triol and preferably contains at least 40% by weight of ethylene oxide adducts. The di-isocyanate may be toluene di-isocyanate, isophorone di-isocyanate, polymethylenepolyphenylene-di-isocyanate, alaphatic di-isocyanates or related materials. The polyols are diols or triols formed by combining ethylene oxide with lower molecular weight diol such as glycerine or a glycol. The polyol may also contain some propylene oxide, butylene oxide or other alaphatic oxides as adducts.

A second reservoir 14 contains an aqueous liquid such as water or water containing solutes. The third reservoir 16 contains a chainstopper or cleaning liquid, such as a glycol. The three reservoirs 12, 14, and 16 may be constructed from any suitable material, such as glass or stainless steel, and each includes an outlet coupled to the mixing system.

The outlet from reservoir 12 is coupled to a tubular pipe 18 which in turn is coupled to a three way valve 20. An outlet of valve 20 is coupled to a pump 21 and then to a flow gauge 22. A short pipe 24 leads from the flow gauge 22 and includes a simple on/off valve 26 which is used to interrupt the flow of liquid through pipe 24 when desired. The outlet from valve 26 is a pipe 28. It is preferred that the various pipes mentioned in this description be constructed of stainless steel, but other materials, such as teflon lined pipes, may be used.

The aqueous reactant leaves reservoir 14 through a pipe 30 and in turn passes through a simiar pump 31, flow gauge 32 connecting pipe 33 and on/off valve 34. The aqueous material leaving the on/off valve 34 also enters pipe 28. Pipe 28 includes a T outlet 36 through which the combined reactants pass into a first mixing head 38.

Mixing head 38 is shown in greater detail in FIG. 2 to include a generally cylindrical, hollow body 40 having a funnel shaped bottom 41 coupled to pipe 36. Head 38 also includes an outlet 43 extending through the upper portion of its side wall. A second cylinder 45 is mounted within body 40, cylinder 45 having an open bottom 50 (facing toward pipe 36) and a closed top 52. The diameter of cylinder 45 is just slightly smaller than the internal diameter of body 40, whereby cylinder 45 is free to rotate therein. Cylinder 45 also includes a plurality of paddle bars 53 mounted within its lower half and a plurality of perforations 54 through its side wall and generally near the top of cylinder 45.

A motor 60 is mounted generally above mixing head 38, the motor having a shaft 61 extending therefrom and being oriented along the axis of body 40 and cylinder 45. The shaft 61 enters the top of body 40 through suitable bearings and water tight packings (not shown in detail) and is affixed to the center of top 52 of cylinder 45. Motor 60 then is capable of rotating cylinder 55 within body 40.

From the foregoing description, it will be apparent that the combined reactants enter body 40 and flow upwardly into cylinder 45. Because that cylinder is rotating (rapidly and at high speed in the preferred embodiment), the reactants are intimately mixed by the action of the paddle bars 53 and as upward flow continues, are further mixed as the reactants flow outwardly through perforations 54. The speed of mixer 38 will depend on the amount of mixing required for the specific chemical system, but as an example an rpm within the range of 1000 to 5000 is preferred.

Another pipe 63 is coupled to the outlet of mixer head 38 and to the inlet of a second mixing head 65. Mixing head 65 is similar to mixing head 38 except that the inlet and outlet are reversed. Mixer 65 is illustrated in detail in FIG. 3. Mixer 65 includes a body 66, an internal cylinder 67 having perforations 68, and a funnel shaped outlet 69. Mixing head 65 also includes a motor 70 having a shaft 71 coupled thereto for rotating cylinder 67 to provide further mixing as the chemical substances move toward outlet 69. Shaft 71 is again sealed through the left of body 66 but in this case passes through cylinder 67 and extends to the outlet 69. It should also be noted that mixing head 65 does not include the paddle bars such as were employed with mixing head 38. Also, motor 70 is a low rpm motor, with speeds in the range of 100 to 500 rpm being preferred. Of course, suitable sealed bearings and packing are provided at the left end of mixing head 65 to permit rotation of shaft 71 and prevent leaks.

A dwell chamber 75 is coupled to the outlet 69 of mixing head 65, chamber 75 constituting an elongate pipe, which again is preferably constructed of stainless steel or teflon lined piping. The length of chamber 75 is selected to produce a proper gel time for the chemical system used with mixer 10 and may range from 12 to 36 inches for polyurethane gel systems. It should also be apparent that the flow rate of the materials through the mixing apparatus will affect time of dwell.

While though the first two mixing heads are designed to emulsify the prepolymer and aqueous materials, the prepolymer will still have a tendency to fall out of the emulsion and adhere to the side walls of the mixing apparatus. The longer the dwell time required for the chemical system, the greater this tendency will be. In the present invention, this tendency is overcome by incorporating a reverse twist auger 78 into the dwell chamber to continuously scrape the walls of the chamber. Auger 78 also imparts a continuous turbulence to the flow of the mixed stream. Auger 78 in the preferred embodiment is constructed from a ribbon of stainless steel and is coupled at one end to shaft 71 of motor 70. The ribbon is twisted to form the auger, with the twist being reversed several times along the auger length, for example about every three inches. The reverse twisting insures adequate turbulence and prevents the emulsion of the two starting materials from breaking up in the dwell chamber.

Product leaving the dwell chamber 75 does so through a dwell chamber outlet pipe 79. Pipe 79 which may include an inlet for another component of the chemical system if desired or required. This inlet is shown in the drawings as pipe 80. The third component may be a chainstopper, such as the glycol previously mentioned and may or may not contain additives or fillers required to give the properties desired of the final product. For purposes of illustration, the third component will be glycol and is stored in reservoir 16. Reservoir 16 may include a stirrer 82 coupled to a low rpm motor 84 by a shaft 85 if stirring of this component is desired. Such stirring may be essential if fillers or additives have a tendency to settle from the carrier liquid.

This chainstopper is pumped from reservoir 16 by pump 87 and flows through a first on/off valve 88, a pipe 89 and a flow guage 90 towards the inlet pipe 80. A second on/off valve 92 may be provided intermediate the flow guage and coupling for a reason which will become apparent later in this description.

Because the mixing of the chainstopper with the emulsion of the prepolymer and aqueous solution can be accomplished quite easily in most cases, the combined flow proceeds through pipe 79 to a static mixer 95. Mixer 95 is of conventional design. Product flowing from the static mixer 95 then proceeds to a complex valve assembly 100 which will be described shortly and which permits the product to be dispersed for use or to be discarded at the discretion of the machine operator. Dispensing occurs through outlet 101 and discharging occurs through pipe 102. Another inlet is provided to valve assembly 100, i.e. a connection directly with pipe 89 carring the chainstopper. Pipe 103 includes a flow gauge 104 and a timer valve 105.

Dealing next with valve assembly 100, it will be of assistance in understanding this component if it is explained at the outset that it may be cleaned of reactive materials whether the reactive material is to be dispensed or discarded. This capability is important because if the dispensing head is shut down for a short time, even a time as short as 10 seconds, a partial gel within the dwell chamber 75 will occur. If the dispensing head is shut down for 10 to 30 seconds, the dwell chamber and the dispensing valve assembly 100 will become totally clogged.

Valve assembly 100 is shown in FIG. 4 to include a body 110 having a cylindrical valve member 112 rotatably disposed therein. The valve member 112 has three passageways formed therein for the flow of material. The first passageway is a straight, elongate channel 113 which is arranged to couple the reactive material inlet from the static mixer 95 to outlet 101 (when in the position shown in FIG. 4). The second passageway 115 is curved and is coupled at one end to the glycol inlet 103. This passageway curves upwardly approximately 90° and generally rearwardly through the valve member 112 and terminates at the surface of member 112. The third passageway is curved channel 117 which in the illustrated orientation begins at the top of valve member 112 and at the rear thereof, curving down approximately 90° and terminating at the discard outlet 102.

Two additional features of the valve remain to be described, i.e. coupling channels 118 and 120. Coupling channel 118 lies outside of the valve body 110 and is generally U-shaped. This channel couples the outlet of channel 115 to the inlet of channel 117 when the valve is in the orientation of FIG. 4. The second coupling channel 120 is also on the outside of valve body 110 and extends generally horizontally along the right side of valve member 112. The forward end is coupled to the outlet of passageway 117. Discard line 102 is also coupled to channel 120.

Now, describing the operation of valve 100, in the illustrated orientation product flows directly through passageway 113 for dispensing, while a glycol path is established from pipe 103 through passageways 115, 118, 117, 120 to discard outlet 102. If the valve member 112 is rotated by 90°, in a clockwise direction, it will be appreciated that a direct line is established from the glycol inlet 103 to the discard pipe 102 through passageway 113. At the same time, a flow path is established for the product stream through passageway 115 from the product inlet pipe to the discard line through passageway 120. In this second mode, channel 113 is flushed while product mixture is being discarded.

From FIG. 1, it will be appreciated that glycol flow to valve assembly 100 is controlled by the timer valve 105. Flushing must be continued for a time sufficient to cleanse the valve lines which contact the reactive mixtures, and it has been determined that a flush of 10 seconds is sufficient in most instances. Obviously, flushing of the valve 100 consumes glycol material and waste is avoided by employing the timer valve as shown in the Figures.

It will also be appreciated that all other parts of the mixer 10 which encounters the prepolymer material or the emulsion may be flushed with the glycol. For example, if it is desired to flush the system, valve 88 may be closed and valve 20 rotated to send the glycol through valve 20, pump 21, flow gauge 22 and through the remaining parts of the apparatus. The aqueous material flow can be interrupted during such flushing by closing valve 34. Similarly, the glycol flow can be directed through pipe 89 and upwardly through the static mixer and dwell chamber 75 by appropriate control of the various valves of the system.

While the present invention has been described by reference to a single preferred embodiment, the invention is not to be limited thereby, but it is to be limited solely by the claims which follow.

I claim:

1. An apparatus for mixing together materials which are reactive with one another, said apparatus comprising:
   a source of a first material;
   a source of a second material;
   a source of a third material;
   first and second conduit means coupled respectively to said first and second sources of material and means for conveying said materials from said sources through said conduit means and controlling the quantity of material conveyed from said sources;
   mixing conduit means coupled to said first and second conduit means;
   mixing means coupled to said mixing conduit means whereby said materials are mixed together;
   an elongate, generally cylindrical dwell chamber coupled to said mixing means whereby mixed materials flowing therethrough will react for a time dependent on the length of said dwell chamber;
   a dispensing means coupled to said dwell chamber;
   a third conduit means coupled to said source of said third material and to said dispensing means;
   said dispensing means including valve means arranged to permit said mixed material to be selectively discharged therefrom to two separate locations through two pathways established within said valve means,
   said third conduit means being coupled to said valve means in such a manner that said third material may be selectively flowed through either of said pathways whereby mixed material may be washed from one pathway while the other pathway is used for discharge of said material.

2. The mixing apparatus set forth in claim 1 wherein said source of third material is coupled by fourth conduit means to said apparatus downstream of said dwell chamber whereby said third material may be used to wash all parts of the mixing apparatus contacted by mixed first and second materials.

3. The mixing apparatus set forth in claim 1 wherein an elongate auger means is rotatably disposed in said dwell chamber and said apparatus further includes means for rotating said auger within said dwell chamber.

4. The mixing apparatus set forth in claim 3 wherein said auger means is constructed and arranged to scrape the wall of said dwell chamber and to mix the reactants flowing therethrough.

5. The mixing apparatus set forth in claim 3 wherein said auger consists of a flat band of material twisted to form an auger and wherein said twist is reversed at least one time along the length of said auger.

6. The mixing apparatus set forth in claim 3 wherein said apparatus further comprises static mixing means intermediate said dwell chamber and said dispensing means.

7. A mixing apparatus comprising:
a first container for a first material;
first pipe means coupling said first container to a mixing pipe means; pump means and valve means for pumping said first material through said first pipe means toward said mixing pipe means and controlling the flow therethrough;
a second container for a second material;
second pipe means coupling said second container to said mixing pipe means; pump means and valve means for pumping said second material through said second pipe means toward said mixing pipe means and controlling the flow therethrough;
first mechanical mixing means having an inlet coupled to said mixing pipe means and an outlet;
second mechanical mixing means having an inlet coupled to the outlet of said first mixing means and an outlet;
an elongate, generally tubular dwell chamber coupled at a first end to the outlet of said second mixing means and having a second end;
static mixing means having an inlet coupled to the outlet of said dwell chamber and an outlet;
dispensing valve means having an inlet coupled to said outlet of said static mixing means and constructed and arranged for dispensing blended and mixed material selectively through one of two dispensing outlets;
elongate auger means rotatably mounted in said dwell chamber and means for rotating said auger means; and,
said apparatus further including a third container for a third material and third pipe means for selectively coupling said third container to said first pipe means, to said dispensing valve means or to said outlet of said dwell chamber whereby said third material may be selectively mixed with said first and second materials or may be employed to wash those parts of the apparatus which have contacted mixed first and second materials, said dispensing valve being arranged whereby said third material may be used to selectively wash either of said dispensing outlets.

8. The invention set forth in claim 7 wherein said auger means comprises a flat strip of metal twisted to form said elongate auger, the width of said strip being slightly less than the diameter of said dwell chamber whereby said auger scrapes the sides of said dwell chamber as it is rotated and wherein the twist of said auger is reversed at least once along the length of said dwell chamber.

* * * * *